United States Patent
Yun

(10) Patent No.: US 10,112,328 B2
(45) Date of Patent: Oct. 30, 2018

(54) FUEL TANK MADE OF POLYKETONE AND METHOD OF MANUFACTURING THE SAME

(71) Applicant: JPC Automotive Co., Ltd., Daejeon (KR)

(72) Inventor: Gwan Won Yun, Gwangmyeong-si (KR)

(73) Assignee: JPC Automotive Co., Ltd., Daejeon (KR)

( * ) Notice: Subject to any disclaimer, the term of this patent is extended or adjusted under 35 U.S.C. 154(b) by 41 days.

(21) Appl. No.: 15/366,306

(22) Filed: Dec. 1, 2016

(65) Prior Publication Data
US 2017/0239858 A1 Aug. 24, 2017

(30) Foreign Application Priority Data

Feb. 18, 2016 (KR) .................... 10-2016-0019304

(51) Int. Cl.
*B29C 45/00* (2006.01)
*B29C 65/16* (2006.01)
(Continued)

(52) U.S. Cl.
CPC ............ *B29C 45/006* (2013.01); *B29C 65/16* (2013.01); *B29C 65/1635* (2013.01);
(Continued)

(58) Field of Classification Search
CPC ............ B29C 45/006; B29C 66/83221; B29C 2045/007; B29C 65/16; B29C 66/8322; B29C 66/71; B29C 66/543; B29C 65/1635; B29C 65/5042; B29C 65/5057; B29C 65/5071; B29C 65/5085; B29C 65/7841; B29C 66/12449; B29C 66/12463; B29C 66/12469; B29C 66/1282; B29C 66/12841; B29C 66/1286; B29C 66/12861;
(Continued)

(56) References Cited

U.S. PATENT DOCUMENTS

| | | | |
|---|---|---|---|
| 6,395,215 B1 * | 5/2002 | Distelhoff | B29C 65/342 156/274.2 |
| 2016/0101547 A1 * | 4/2016 | Bland | B32B 7/045 428/36.92 |

FOREIGN PATENT DOCUMENTS

| KR | 10-2001-0030223 A | 4/2001 |
|---|---|---|
| KR | 10-2013-0033818 A | 4/2013 |

* cited by examiner

*Primary Examiner* — Vishal I Patel
(74) *Attorney, Agent, or Firm* — Novick, Kim & Lee, PLLC; Jae Youn Kim

(57) ABSTRACT

Provided are a fuel tank made of polyketone and a method of manufacturing the same. The method includes injection-molding an upper cover and a lower cover using an injection-molding machine, placing the upper cover and the lower cover at a relatively high position and a relatively low position, respectively, assembling the upper cover and the lower cover with each other, and bonding contact surfaces between the upper cover and the lower cover to each other using a laser beam. Since the upper cover and the lower cover are formed at the same time and are bonded to each other immediately after being assembled by a machine, it is possible to achieve automated production, mass production and remarkable cost reduction. Further, since the fuel tank has sufficient rigidity due to the rigidity of polyketone without an additional reinforcing member, it is possible to manufacture a lightweight fuel tank.

5 Claims, 7 Drawing Sheets

(51) Int. Cl.
| | |
|---|---|
| *B60K 15/03* | (2006.01) |
| *B29C 65/78* | (2006.01) |
| *B29C 65/00* | (2006.01) |
| B29K 61/00 | (2006.01) |
| B29L 31/00 | (2006.01) |
| B29K 73/00 | (2006.01) |
| B29C 65/50 | (2006.01) |

(52) U.S. Cl.
CPC ...... *B29C 65/7841* (2013.01); *B29C 66/1282* (2013.01); *B29C 66/1286* (2013.01); *B29C 66/12449* (2013.01); *B29C 66/12463* (2013.01); *B29C 66/12469* (2013.01); *B29C 66/12841* (2013.01); *B29C 66/12861* (2013.01); *B29C 66/1312* (2013.01); *B29C 66/14* (2013.01); *B29C 66/301* (2013.01); *B29C 66/54* (2013.01); *B29C 66/543* (2013.01); *B29C 66/71* (2013.01); *B29C 66/8322* (2013.01); *B29C 66/83221* (2013.01); *B60K 15/03006* (2013.01); *B60K 15/03177* (2013.01); *B29C 65/5042* (2013.01); *B29C 65/5057* (2013.01); *B29C 65/5071* (2013.01); *B29C 65/5085* (2013.01); *B29C 2045/007* (2013.01); *B29K 2061/00* (2013.01); *B29K 2073/00* (2013.01); *B29L 2031/7172* (2013.01); *B60K 2015/03032* (2013.01); *B60K 2015/03493* (2013.01)

(58) Field of Classification Search
CPC ... B29C 66/1312; B29C 66/14; B29C 66/301; B29C 66/54; B60K 15/03177; B60K 15/03006; B60K 2015/03493; B60K 2015/03032; B29K 2061/00; B29K 2073/00; B29K 2077/00; B29L 2031/7172
See application file for complete search history.

FUEL TANK MADE OF POLYKETONE AND METHOD OF MANUFACTURING THE SAME

BACKGROUND OF THE INVENTION

Field of the Invention

The present invention relates to a fuel tank made of polyketone and a method of manufacturing the same, and more particularly, to a fuel tank made of polyketone and a method of manufacturing the same, which enables automated production and mass production of a fuel tank by forming two components, namely an upper cover and a lower cover, at the same time and bonding them to each other immediately after assembling them with each other using a machine.

Description of the Related Art

In general, a vehicle fuel device is a device for supplying a fuel-air mixture to an engine, and includes a vaporizer for forming a fuel-air mixture and supplying the same to an engine or an injector for spraying a fuel into a combustion chamber of an engine, a fuel pump for supplying a filtered fuel to the vaporizer or the injector, and a fuel tank for storing a fuel therein.

The aforementioned components are connected to each other via fuel pipes. The fuel tank is constructed such that a tank body is made from a thin steel plate and a filler hose defining a fuel injection hole is communicatively coupled to the tank body so as to fill the tank body with a fuel.

A fuel tank disclosed in Patent Document 1 is manufactured by a first injection-molding process, a second injection-molding process, and a process of adding a rigidity-reinforcing material to a bonding portion. That is, additional post-processing for supporting a bonding portion is conducted after the first and second injection-molding processes.

However, the method of manufacturing the fuel tank disclosed in Patent Document 1, in which the rigidity of the fuel tank is reinforced and the bonding portion thereof is supported through additional post-processing (fixing rods/clamps, fiber, additional double injection molding, or dovetail process using thermosetting resin) after the injection-molding process, has limitations pertaining to mass production and cost reduction. Further, due to the limits of the properties of the material composing the fuel tank, the rigidity of the fuel tank must be reinforced through an additional reinforcement process (fixing rods, fiber, double injection molding, or dovetail process) after the bonding process, thus leading to an increase in weight and cost.

Alternatively, the fuel tank disclosed in Patent Document 2 is manufactured by a first blow-molding process, a process of inserting a rigidity-reinforcing material, and a second blow-molding process. That is, additional cutting and inserting processes are conducted between the first blow-molding process and the second blow-molding process.

However, in the method of manufacturing the fuel tank disclosed in Patent Document 2, in which the first molded product made by the first blow-molding process is cut, a rigidity-reinforcing material is inserted into the first molded product and the second blow-molding process is conducted on the rigidity-reinforcing material, there are limitations in mass production and cost reduction due to the additional post-processing and manual tasks.

Further, due to the characteristics of the blow molding, it is not possible to form partitions for preventing the flow noise in the fuel tank disclosed in the Patent Document 2. If it is intended to add partitions to the fuel tank, additional separate components must be inserted into the fuel tank. Furthermore, the insertion of an additional rigidity-reinforcing material inevitably results in an increase in weight.

RELATED ART DOCUMENT

Patent Document (Patent Document 1) Korean Patent Publication No. 10-2001-0030223
(Patent Document 2) Korean Patent Publication No. 10-2013-0033818

SUMMARY OF THE INVENTION

Therefore, the present invention has been made in view of the above problems, and it is an object of the present invention to provide a fuel tank made of polyketone and a method of manufacturing the same, in which an upper cover and a lower cover are formed at the same time and are bonded to each other immediately after being assembled with each other by a machine, thereby achieving automated production, mass production and remarkable cost reduction.

It is another object of the present invention to provide a fuel tank made of polyketone and a method of manufacturing the same, which enables the fuel tank to have sufficient rigidity due to the rigidity of polyketone without the necessity for an additional reinforcing member, thereby making it possible to manufacture a lightweight fuel tank.

In accordance with the present invention, the above and other objects can be accomplished by the provision of a method of manufacturing a fuel tank using polyketone including injection-molding an upper cover and a lower cover using an injection-molding machine, placing the upper cover and the lower cover, injection-molded in the injection-molding, at a relatively high position and a relatively low position, respectively, and assembling the upper cover and the lower cover with each other, and bonding contact surfaces between the upper cover and the lower cover, assembled with each other in the assembling, to each other using a laser beam.

The upper cover and the lower cover, injection-molded by the injection-molding machine, may be made of polyketone so as to improve rigidity thereof.

The method may further include pressurizing an outer side surface of at least one of the upper cover and the lower cover using at least one roller between the assembling and the bonding, and the bonding may be performed while the roller pressurizes the outer side surface of at least one of the upper cover and the lower cover in the pressurizing.

The upper cover and the lower cover may have edges having shapes corresponding to each other such that one of the upper cover and the lower cover has a protruding portion formed on the edge thereof and a remaining one has an insertion recess formed in the edge thereof, into which the protruding portion is fitted.

Each of the protruding portion and the insertion recess may have at least one support surface formed in one side surface thereof, the support surface being parallel to outer side surfaces of the upper cover and the lower cover so as to support a pressurization force of the roller pressurizing the outer side surface of at least one of the upper cover and the lower cover in the pressurizing.

The upper cover may have an upper protruding stepped portion protruding from an outer side surface of the edge of the upper cover, the lower cover may have a lower protruding stepped portion protruding from an outer side surface of the edge of the lower cover, and the pressurizing may include pressurizing the upper protruding stepped portion downward from above using one roller and pressurizing the lower protruding stepped portion upward from below using another roller.

The upper protruding stepped portion may have at least one support surface formed in a bottom surface thereof, the support surface being parallel to a top surface of the upper protruding stepped portion, and the lower protruding stepped portion may have at least one support surface formed in a top surface thereof, the support surface being parallel to a bottom surface of the lower protruding stepped portion, whereby the support surface of the upper protruding stepped portion and the support surface of the lower protruding stepped portion may support a pressurization force of the roller pressurizing the upper protruding stepped portion and the lower protruding stepped portion in the pressurizing.

The injection-molding may include injection-molding an intermediate cover, the intermediate cover having insertion recesses formed therein, into which a lowermost edge of the upper cover and an uppermost edge of the lower cover are fitted, the assembling may include assembling the intermediate cover between the upper cover and the lower cover, and the bonding may include bonding contact surfaces between the upper cover and the intermediate cover to each other and bonding contact surfaces between the lower cover and the intermediate cover to each other using the laser beam.

The injection-molding may include injection-molding the upper cover and the lower cover such that a partition for preventing fuel flow is formed at an inner side surface of at least one of the upper cover and the lower cover.

The partition for preventing fuel flow formed at the upper cover may include a support protrusion protruding below the edge of the upper cover, the partition for preventing fuel flow formed at the lower cover may include a support protrusion protruding above the edge of the lower cover, and the support protrusion may support a pressurization force of the roller pressurizing the outer side surface of at least one of the upper cover and the lower cover in the pressurizing.

BRIEF DESCRIPTION OF THE DRAWINGS

The above and other objects, features and other advantages of the present invention will be more clearly understood from the following detailed description taken in conjunction with the accompanying drawings, in which.

DETAILED DESCRIPTION OF THE PREFERRED EMBODIMENTS

Figure 1:
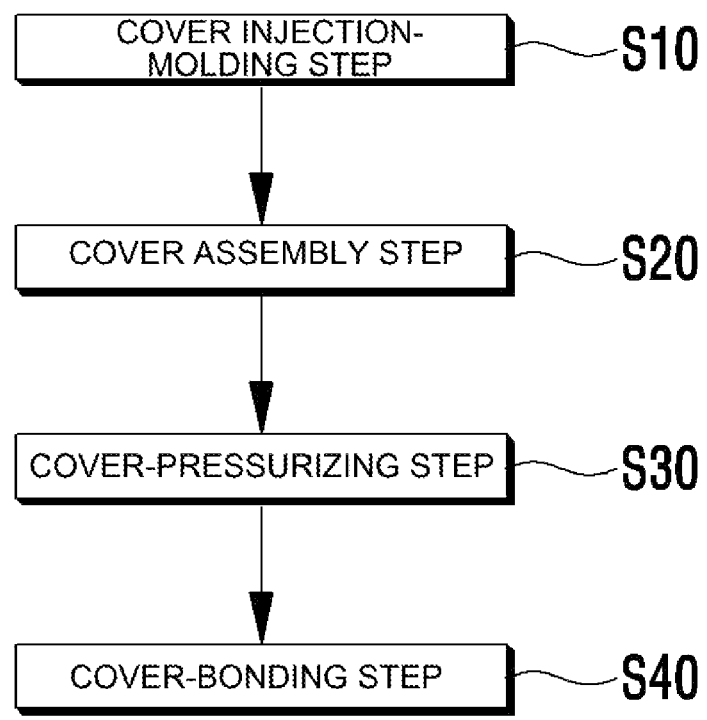
FIG. 1 is a flowchart showing a method of manufacturing a fuel tank using polyketone according to a preferred embodiment of the present invention.

Advantages and features of the present invention and methods for achieving them will be made clear from the embodiments described below in detail with reference to the accompanying drawings. The present invention may, however, be embodied in many different forms and should not be construed as being limited to the embodiments set forth herein. Rather, these embodiments are provided so that this disclosure will be thorough and complete, and will fully convey the scope of the invention to those skilled in the art. The present invention is merely defined by the scope of the claims. Like reference numerals refer to like elements throughout the specification.

Hereinafter, a fuel tank made of polyketone and a method of manufacturing the same will be described in detail in connection with preferred embodiments of the present invention with reference to the accompanying drawings.

Figure 2:
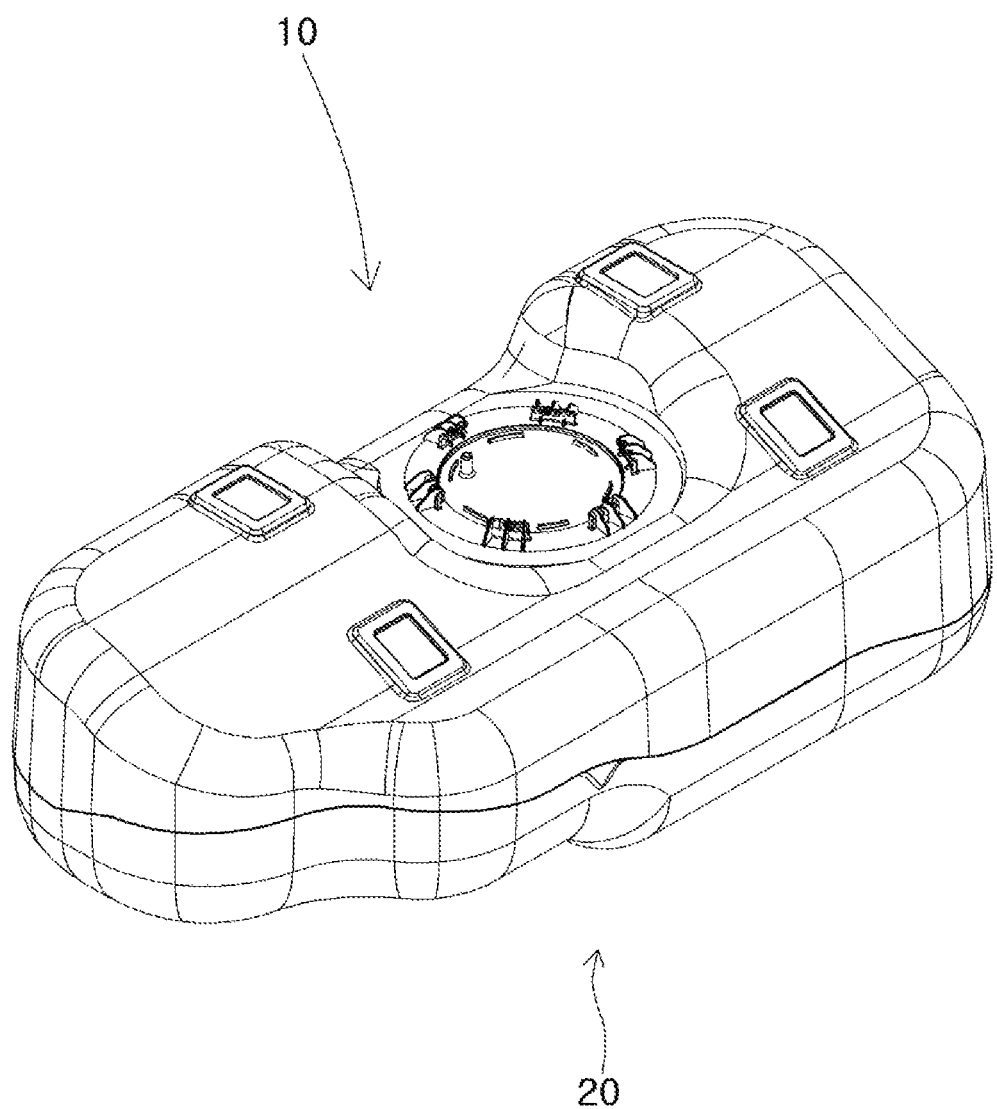
FIG. 2 is a perspective view showing the fuel tank according to the preferred embodiment of the present invention.
Figure 3:
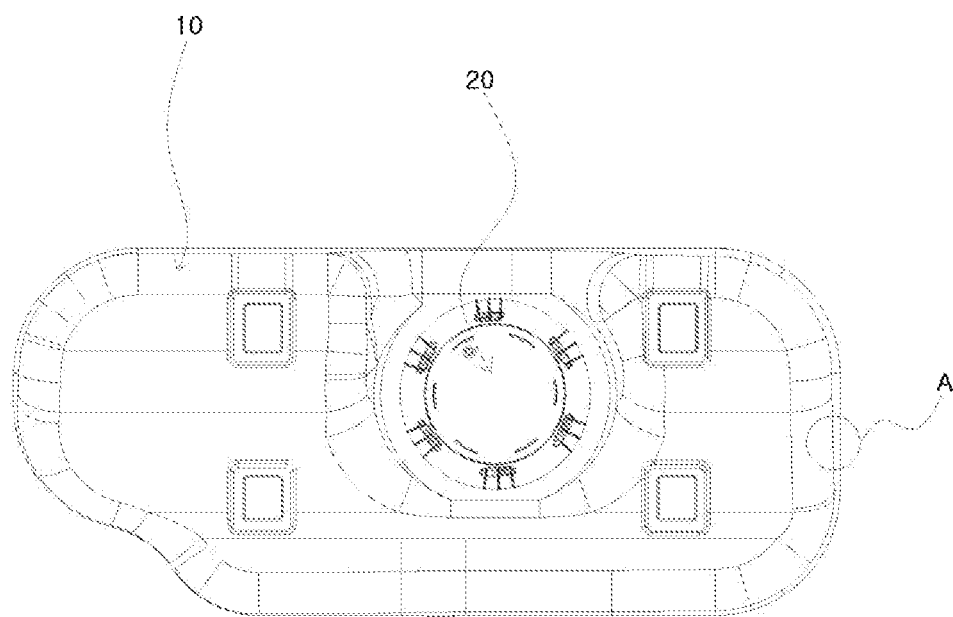
FIG. 3 is a plan view showing the fuel tank according to the preferred embodiment of the present invention.

FIG. 1 is a flowchart showing a method of manufacturing a fuel tank using polyketone according to a preferred embodiment of the present invention. FIG. 2 is a perspective view showing the fuel tank according to the preferred embodiment of the present invention. FIG. 3 is a plan view showing the fuel tank according to the preferred embodiment of the present invention. FIGS. 4 to 7 are side sectional views showing various modifications of portion A in FIG. 3.

Referring to FIGS. 1 to 7, a method of manufacturing a fuel tank using polyketone according to the present invention comprises a cover injection-molding step (S10), a cover assembly step (S20), a cover-pressurizing step (S30), and a cover-bonding step (S40).

The cover injection-molding step (S10) is a step of injection-molding an upper cover 10 and a lower cover 20 using an injection-molding machine.

The cover injection-molding step (S10) may further include a step of injection-molding an intermediate cover 60, which has insertion recesses 61 formed therein, into which the lowermost edge of the upper cover 10 and the uppermost edge of the lower cover 20 are fitted.

The upper cover 10, the lower cover 20 and the intermediate cover 60 may be injection-molded of polyketone using an injection-molding machine so as to enhance the rigidity of the covers.

Polyketone is a new material made by terpolymerization of carbon monoxide, ethylene and propylene.

Polyketone has excellent endurance against heat, friction, shock and chemicals, and is therefore used as an industrial plastic material that is capable of replacing metals. Specifically, polyketone has improved shock resistance, which is up to two times higher than that of plastic nylon, and improved friction resistance, which is up to fourteen times higher than that of plastic nylon, and is therefore expected to be used as an industrial material for use in vehicles, electronic components, etc.

The cover assembly step (S20) is a step of placing the upper cover 10 and the lower cover 20, which have been injection-molded in the cover injection-molding step (S10), at a relatively high position and a relatively low position, respectively, and of assembling them with each other.

The cover assembly step (S20) may further include a step of assembling the intermediate cover 60 between the upper cover 10 and the lower cover 20.

The cover-pressurizing step (S30) is a step of pressurizing the outer side surface of at least one of the upper cover 10 and the lower cover 20 using at least one roller 40.

The cover-pressurizing step (S30) may further include a step of pressurizing the outer side surface of the intermediate cover 60 using at least one roller 40. In the cover-pressurizing step (S30), the upper cover 10 may be pressurized toward the lower cover 20 by the roller 40 or other devices.

Further, in the cover-pressurizing step (S30), both the outer side surface of the upper cover 10 and the outer side surface of the lower cover 20, both the outer side surface of the upper cover 10 and the outer side surface of the intermediate cover 60, or both the outer side surface of the lower cover 20 and the outer side surface of the intermediate cover 60 may be simultaneously pressurized by a single roller 40.

The cover-bonding step (S40) is a step of bonding the contact surfaces between the upper cover 10 and the lower cover 20, which have been assembled in the cover assembly step (S20), using a laser beam 50. At this time, a laser beam machine for emitting the laser beam 50 may be used.

In the cover-bonding step (S40), the contact surfaces between the upper cover 10 and the intermediate cover 60 and the contact surfaces between the lower cover 20 and the intermediate cover 60 may be respectively bonded to each other by the laser beam 50.

Here, the cover-bonding step (S40) may be performed while the roller 40 pressurizes the outer side surface of at least one of the upper cover 10 and the lower cover 20 in the cover-pressurizing step (S30).

The above-described method of manufacturing the fuel tank using polyketone according to the present invention has an advantage in that it is capable of enabling automated production, mass production and remarkable cost reduction, since two components, namely the upper cover 10 and the lower cover 20, are formed at the same time and are bonded to each other immediately after being assembled with each other by a machine. In addition, since the fuel tank is capable of having sufficient rigidity due to the rigidity of polyketone without the necessity for an additional reinforcing member, it is possible to manufacture a lightweight fuel tank.

Hereinafter, the upper cover 10, the lower cover 20 and the intermediate cover 60, which are injection-molded in the above-described cover injection-molding step (S10), will be explained.

The upper cover 10 and the lower cover 20 are formed such that the edges thereof have shapes corresponding to each other so as to mesh with each other.

When the edge of the upper cover 10 and the edge of the lower cover 20 are assembled with each other, the inner side surface or the outer side surface of the upper cover 10 and the inner side surface or the outer side surface of the lower cover 20 lie in the same plane and are maintained in an aligned state, thereby preventing them from becoming offset relative to each other by external force.

Figure 4:
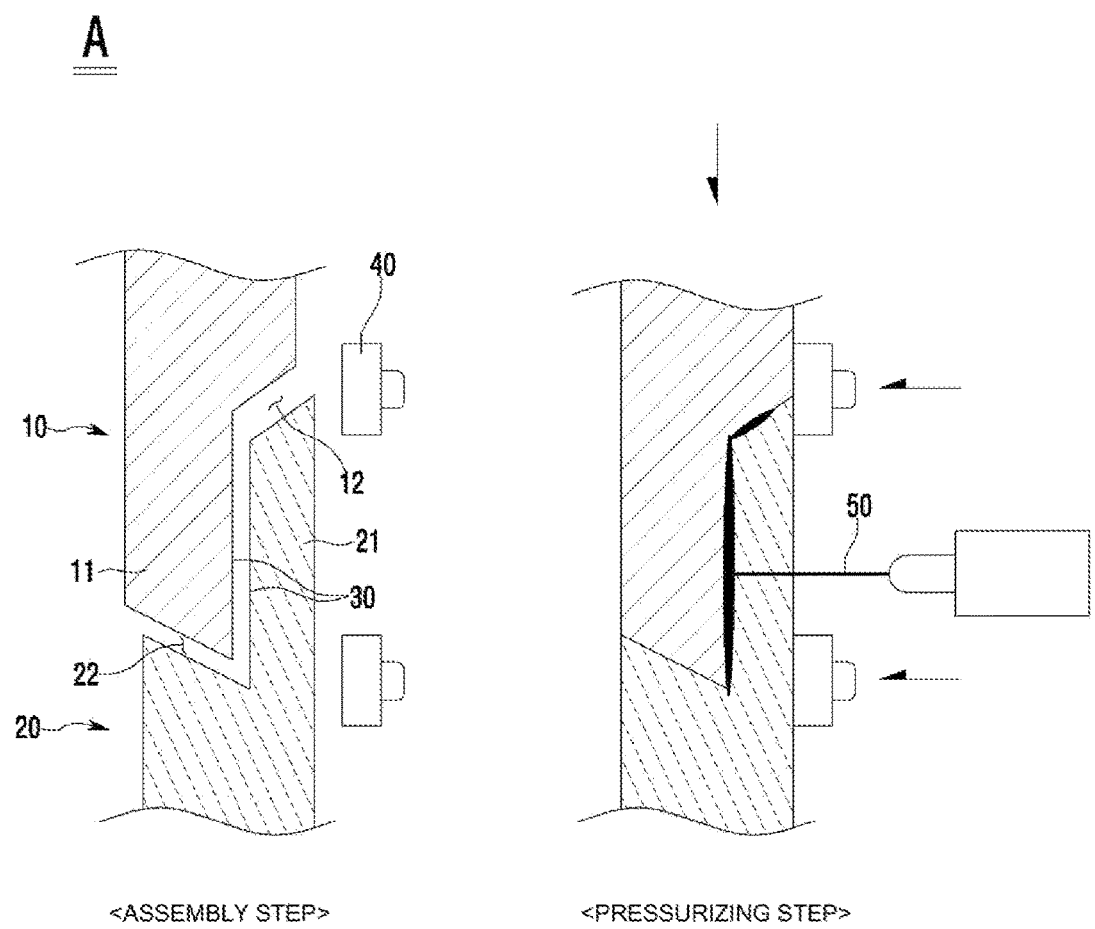
FIGS. 4 to 7 are side sectional views showing various modifications of portion A in FIG. 3.

Specifically, as shown in FIG. 4, one of the upper cover 10 and the lower cover 20 has a protruding portion 11 or 21 formed on the edge thereof, and the other one has an insertion recess 12 or 22 formed in the edge thereof, into which the protruding portion 11 or 21 is fitted.

The protruding portion 11 or 21 may be configured as a protrusion that protrudes from the middle portion of the edge of one of the upper cover 10 and the lower cover 20 or a protrusion that extends from the inner side surface or the outer side surface of the edge of one of the upper cover 10 and the lower cover 20.

Each of the protruding portion 11 or 21 and the insertion recess 12 or 22 has at least one support surface 30 formed in one side surface thereof, which is parallel to the outer side surfaces of the upper cover 10 and the lower cover 20, so as to support the pressurization force of the roller 40, which pressurizes the outer side surface of at least one of the upper cover 10 and the lower cover 20 in the cover-pressurizing step (S30).

The support surface 30 has two opposite ends, which are bent and extend diagonally or perpendicular relative to the support surface 30 in the outward or inward direction of the cover.

Further, each of the protruding portion 11 or 21 and the insertion recess 12 or 22 may have an opposite side surface that extends diagonally.

In the cover-bonding step (S40), the contact surfaces, that is, the support surfaces 30, at which the upper cover 10 and the lower cover 20, having been assembled in the cover assembly step (S20), are brought into contact with each other, are bonded to each other by the laser beam 50.

Figure 5:
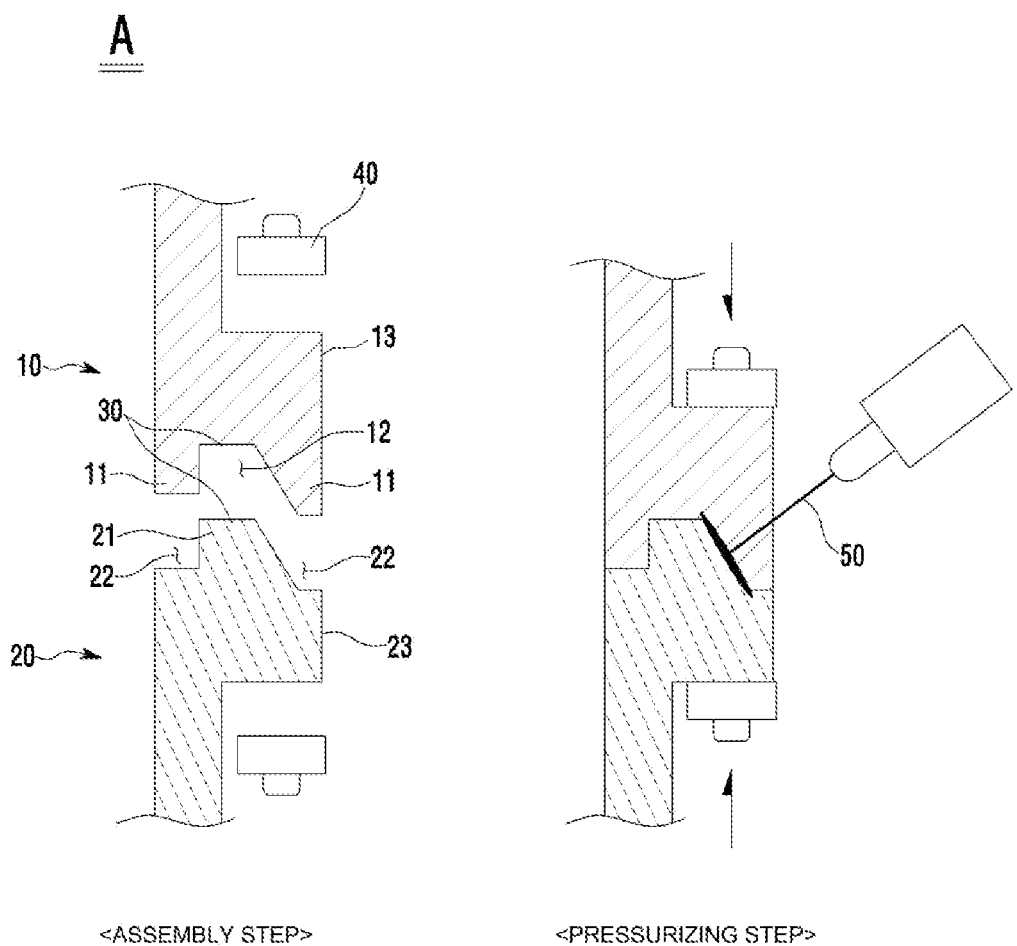

Referring to FIG. 5, the upper cover 10 has an upper protruding stepped portion 13, which protrudes from the outer side surface of the edge of the upper cover 10. The bottom surface of the upper protruding stepped portion 13 and the bottom surface of the edge of the upper cover 10 extend so as to form a protruding portion 11 and an insertion recess 12.

In addition, the lower cover 20 has a lower protruding stepped portion 23, which protrudes from the outer side surface of the edge of the lower cover 20. The top surface of the lower protruding stepped portion 23 and the top surface of the edge of the lower cover 20 extend so as to form a protruding portion 21 and an insertion recess 22.

In the cover-pressurizing step (S30), one roller 40 pressurizes the upper protruding stepped portion 13 downward from above, and another roller 40 pressurizes the lower protruding stepped portion 23 upward from below.

Here, the upper protruding stepped portion 13 has at least one support surface 30 formed in the bottom surface thereof, which is parallel to the top surface of the upper protruding stepped portion 13, and the lower protruding stepped portion 23 has at least one support surface 30 formed in the top surface thereof, which is parallel to the bottom surface of the lower protruding stepped portion 23, so as to support the pressurization force of the roller 40, which pressurizes the upper protruding stepped portion 13 and the lower protruding stepped portion 23 in the cover-pressurizing step (S30).

In the cover-bonding step (S40), the contact surfaces, that is, the surfaces diagonally extending from the support surfaces 30, at which the upper protruding stepped portion 13 and the lower protruding stepped portion 23, having been assembled in the cover assembly step (S20), are brought into contact with each other, are bonded to each other by the laser beam 50.

Figure 6:
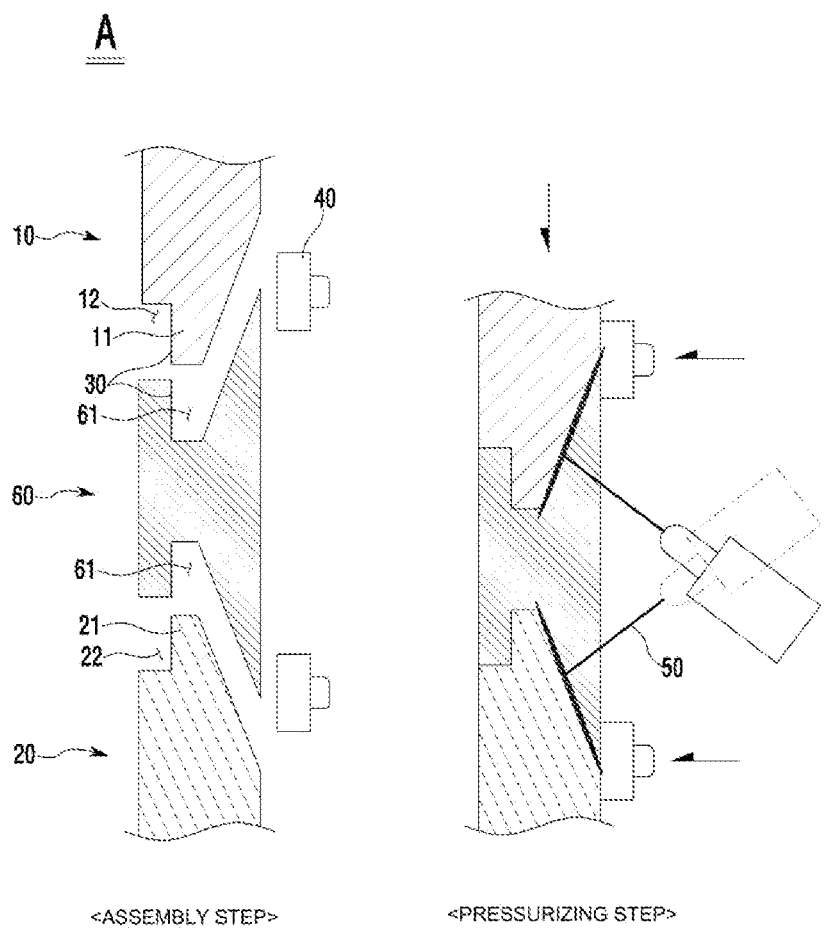

Referring to FIG. 6, the intermediate cover 60, which has been injection-molded in the cover injection-molding step (S10), is disposed between the edge of the upper cover 10 and the edge of the lower cover 20.

The intermediate cover 60 has a top surface having a shape corresponding to the edge of the upper cover 10 and a bottom surface having a shape corresponding to the edge of the lower cover 20. The intermediate cover 60 has a pair of insertion recesses 61, one of which is formed in the middle portion of the top surface of the intermediate cover 60 so as to receive the protruding portion 11 protruding downwards from the edge of the upper cover 10 and the other one of which is formed in the middle portion of the bottom surface of the intermediate cover 60 so as to receive the protruding portion 21 protruding upwards from the edge of the lower cover 20.

The intermediate cover 60 has support surfaces 30. Each of the support surfaces 30 is formed in one side surface of each of the insertion recesses 61, which is located at a relatively inward position in the intermediate cover 60, and extends vertically and parallel to the outer side surfaces of the upper cover 10 and the lower cover 20 so as to support the pressurization force of the roller 40.

An opposite side surface of each of the insertion recesses 61, which is located at a relatively outward position in the intermediate cover 60, extends diagonally to the outer side surface of the intermediate cover 60. That is, the pair of insertion recesses 61 is formed in the intermediate cover 60 such that the width thereof is gradually increased along the opposite side surface thereof, which extends diagonally in the outward direction of the intermediate cover 60.

In the cover-bonding step (S40), the contact surfaces, at which the upper protruding stepped portion 13 and the lower protruding stepped portion 23, having been assembled in the cover assembly step (S20), are brought into contact with the opposite side surfaces of the insertion recesses 61 formed in the intermediate cover 60, are bonded to each other by the laser beam 50.

Figure 7:
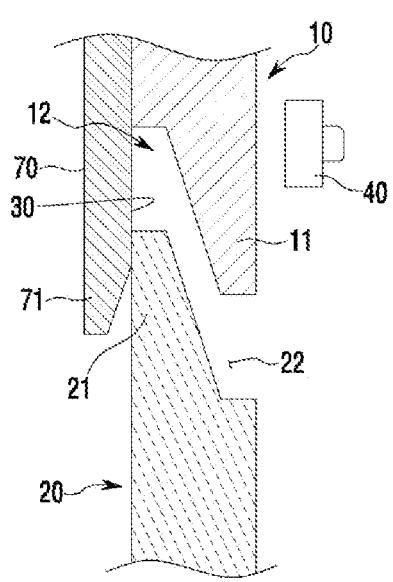
Figure 7:
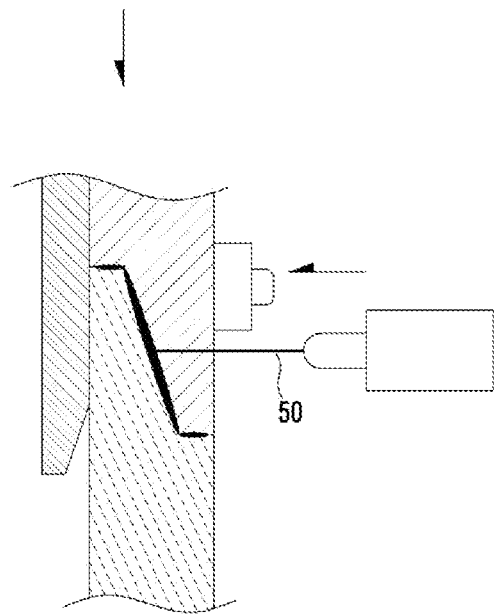

Referring to FIG. 7, in the cover injection-molding step (S10), the upper cover 10 and the lower cover 20 are injection-molded such that a partition 70 for preventing fuel flow is formed at the inner side surface of at least one of the upper cover 10 and the lower cover 20.

The partition 70 for preventing fuel flow formed at the upper cover 10 includes a support protrusion 71, which protrudes below the edge of the upper cover 10.

The partition 70 for preventing fuel flow formed at the lower cover 20 includes a support protrusion 71, which protrudes above the edge of the lower cover 20.

Alternatively, the partitions 70 for preventing fuel flow may be formed on both the inner side surface of the upper cover 10 and the inner side surface of the lower cover 20. At this time, the support protrusion 71 of the upper cover 10 and the support protrusion 71 of the lower cover 20 may be formed such that they are offset relative to each other.

The support protrusion 71 may function to support the pressurization force of the roller 40, which pressurizes the outer side surface of at least one of the upper cover 10 and the lower cover 20 in the cover-pressurizing step (S30).

Further, when the support protrusion 71 is formed at the cover, there is no need to form the above-described support surfaces 30 at the edges of the upper cover 10 and the lower cover 20.

In the cover-bonding step (S40), the contact surfaces, at which the upper protruding stepped portion 13 and the lower protruding stepped portion 23, having been assembled in the cover assembly step (S20), are brought into contact with the opposite side surfaces of the insertion recesses 61 formed in the intermediate cover 60, are bonded to each other by the laser beam 50.

Since the structure of the fuel tank made of polyketone has been described above in detail with reference to the method of manufacturing the same, an explanation thereof will be omitted.

As is apparent from the above description, in the fuel tank made of polyketone and the method of manufacturing the same according to the present invention, it is possible to achieve automated production, mass production and remarkable cost reduction, since two components, namely the upper cover and the lower cover, are formed at the same time and are bonded to each other immediately after being assembled with each other by a machine. In addition, since the fuel tank is capable of having sufficient rigidity due to the rigidity of polyketone without the necessity for an additional reinforcing member, it is possible to manufacture a lightweight fuel tank.

Although the preferred embodiments of the present invention have been disclosed, those skilled in the art will appreciate that various modifications, additions and substitutions are possible, without departing from the scope and spirit of the invention as disclosed in the accompanying claims. Therefore, it is to be understood that the preferred embodiments described in the specification are illustrative only and are not intended to represent all aspects of the present invention. The scope of the present invention is defined by the following claims rather than by the detailed description of the preferred embodiments. It shall be understood that all modifications and embodiments conceived from the meaning and scope of the claims and their equivalents are included in the scope of the present invention. The processes described for the respective steps may not necessarily be performed in the temporal sequence in which they have been described. As long as the gist of the present invention is satisfied, even if the order in which the respective steps are performed is changed, these processes may be included in the scope of the present invention.

What is claimed is:

1. A method of manufacturing a fuel tank using polyketone, comprising:
   injection-molding an upper cover and a lower cover using an injection-molding machine;
   placing the upper cover and the lower cover, injection-molded in the injection-molding, at a relatively high position and a relatively low position, respectively, and assembling the upper cover and the lower cover with each other; and
   bonding contact surfaces between the upper cover and the lower cover, assembled with each other in the assembling, to each other using a laser beam,
   wherein the upper cover and the lower cover, injection-molded by the injection-molding machine, are made of polyketone so as to improve rigidity thereof,
   the method further comprises pressurizing an outer side surface of at least one of the upper cover and the lower cover using at least one roller between the assembling and the bonding,
   the bonding is performed while the roller pressurizes the outer side surface of at least one of the upper cover and the lower cover in the pressurizing,
   the upper cover and the lower cover have edges having shapes corresponding to each other such that one of the upper cover and the lower cover has a protruding portion formed on the edge thereof and a remaining one has an insertion recess formed in the edge thereof, into which the protruding portion is fitted, and
   each of the protruding portion and the insertion recess has at least one support surface formed in one side surface thereof, the support surface being parallel to outer side surfaces of the upper cover and the lower cover so as to support a pressurization force of the roller pressurizing the outer side surface of at least one of the upper cover and the lower cover in the pressurizing,
   wherein the injection-molding includes injection-molding an intermediate cover, the intermediate cover having insertion recesses formed therein, into which a lowermost edge of the upper cover and an uppermost edge of the lower cover are fitted,
   the assembling includes assembling the intermediate cover between the upper cover and the lower cover, and
   the bonding includes bonding contact surfaces between the upper cover and the intermediate cover to each other and bonding contact surfaces between the lower cover and the intermediate cover to each other using the laser beam.

2. The method according to claim 1, wherein the upper cover has an upper protruding stepped portion protruding from an outer side surface of the edge of the upper cover, the lower cover has a lower protruding stepped portion protruding from an outer side surface of the edge of the lower cover, and the pressurizing includes pressurizing the upper protruding stepped portion downward from above using one roller and pressurizing the lower protruding stepped portion upward from below using another roller.

3. The method according to claim 2, wherein the upper protruding stepped portion has at least one support surface formed in a bottom surface thereof, the support surface being parallel to a top surface of the upper protruding stepped portion, and the lower protruding stepped portion has at least one support surface formed in a top surface thereof, the support surface being parallel to a bottom surface of the lower protruding stepped portion, whereby the support surface of the upper protruding stepped portion and the support surface of the lower protruding stepped portion support a pressurization force of the roller pressurizing the upper protruding stepped portion and the lower protruding stepped portion in the pressurizing.

4. The method according to claim 1, wherein the injection-molding includes injection-molding the upper cover and the lower cover such that a partition for preventing fuel flow is formed at an inner side surface of at least one of the upper cover and the lower cover.

5. The method according to claim 4, wherein the partition for preventing fuel flow formed at the upper cover includes a support protrusion protruding below the edge of the upper cover, the partition for preventing fuel flow formed at the lower cover includes a support protrusion protruding above the edge of the lower cover, and the support protrusion supports a pressurization force of the roller pressurizing the outer side surface of at least one of the upper cover and the lower cover in the pressurizing.

* * * * *